United States Patent
Ueda

(10) Patent No.: US 9,414,290 B2
(45) Date of Patent: Aug. 9, 2016

(54) MOBILITY CONTROL METHOD AND DEVICE IN MOBILE COMMUNICATION NETWORK

(71) Applicant: NEC Corporation, Tokyo (JP)

(72) Inventor: Yoshio Ueda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/424,806

(22) PCT Filed: Aug. 27, 2013

(86) PCT No.: PCT/JP2013/005038
§ 371 (c)(1),
(2) Date: Feb. 27, 2015

(87) PCT Pub. No.: WO2014/034089
PCT Pub. Date: Mar. 6, 2014

(65) Prior Publication Data
US 2015/0264622 A1 Sep. 17, 2015

(30) Foreign Application Priority Data
Aug. 30, 2012 (JP) .................................. 2012-189474

(51) Int. Cl.
*H04W 36/00* (2009.01)
*H04W 36/32* (2009.01)
*H04W 76/04* (2009.01)
(Continued)

(52) U.S. Cl.
CPC .......... *H04W 36/38* (2013.01); *H04W 36/0083* (2013.01); *H04W 36/04* (2013.01); *H04W 36/32* (2013.01); *H04W 76/046* (2013.01);
(Continued)

(58) Field of Classification Search
CPC . H04W 36/0083; H04W 36/04; H04W 36/32; H04W 36/38; H04W 48/20; H04W 76/046; H04W 88/02; H04W 88/08
See application file for complete search history.

(56) References Cited

U.S. PATENT DOCUMENTS

| 5,907,808 A | 5/1999 | Vaara et al. |
| 6,208,863 B1 | 3/2001 | Salonaho |

(Continued)

FOREIGN PATENT DOCUMENTS

| JP | H09-512142 A | 12/1997 |
| JP | H11-509069 A | 8/1999 |

(Continued)

OTHER PUBLICATIONS

3GPP TS 25.304 V10.4.0 (Mar. 2012) User Equipment (UE) procedures in idle mode and procedures for cell reselection in connected mode (Release 10) (pp. 1-52).

(Continued)

*Primary Examiner* — Kashif Siddiqui
(74) *Attorney, Agent, or Firm* — Wilmer Cutler Pickering Hale and Dorr LLP

(57) ABSTRACT

A mobility control method and device that can suppress an increase of location registration signaling are provided. In a mobile communication network including cells (21*a*, 21*b*) of multiple types differing in cell size, mobility determination times (T_reselection) are determined for individual neighbor cells (22*a*-29*d*) or individual neighbor cell types (Operation 303), and mobility control is performed by determining whether or not a predetermined mobility criterion remains satisfied during the mobility determination time set for a neighbor cell (Operations 304-306).

18 Claims, 17 Drawing Sheets

(51) Int. Cl.
*H04W 36/38* (2009.01)
*H04W 36/04* (2009.01)
*H04W 48/20* (2009.01)
*H04W 88/02* (2009.01)
*H04W 88/08* (2009.01)

(52) U.S. Cl.
CPC ............... *H04W48/20* (2013.01); *H04W 88/02* (2013.01); *H04W 88/08* (2013.01)

(56) References Cited

U.S. PATENT DOCUMENTS

| | | | |
|---|---|---|---|
| 8,660,092 B2* | 2/2014 | Jeon | H04W 36/0083 370/332 |
| 2005/0128969 A1* | 6/2005 | Lee | H04W 36/32 370/313 |
| 2010/0029274 A1 | 2/2010 | Deshpande et al. | |
| 2011/0021201 A1 | 1/2011 | Lee et al. | |
| 2011/0124340 A1* | 5/2011 | Puttonen | H04W 36/0083 455/437 |
| 2011/0236262 A1 | 9/2011 | Horii et al. | |
| 2013/0040692 A1* | 2/2013 | Chen | H04W 36/04 455/525 |
| 2015/0011219 A1* | 1/2015 | Saily | H04W 36/0094 455/436 |

FOREIGN PATENT DOCUMENTS

| | | |
|---|---|---|
| WO | WO-95/28813 A1 | 10/1995 |
| WO | WO-97/39599 A1 | 10/1997 |
| WO | WO-2009/007720 A2 | 1/2009 |
| WO | WO-2009/007720 A3 | 1/2009 |
| WO | WO-2011/053534 A1 | 5/2011 |
| WO | WO-2011/123006 A1 | 10/2011 |

OTHER PUBLICATIONS

3GPP TS 25.331 V11.0.0 (Dec. 2011) Radio Resource Control (RRC); Protocol specification (Release 11) (12 pages).
3GPP TS 36.304 V10.4.0 (Dec. 2011) Evolved Universal Terrestrial Radio Access (E-UTRA); User Equipment (UE) procedures in idle mode (Release 10) (pp. 1-33).
3GPP TS36.331 V10.5.0 (Mar. 2012) Evolved Universal Terrestrial Radio Access (E-UTRA); Radio Resource Control (RRC); Protocol specification (Release 10) (11 pages).
International Search Report corresponding to PCT/JP2013/005038 mailed Oct. 29, 2013.
Japanese Office Action corresponding to Japanese Application No. 2014-532787, dated Feb. 10, 2016, 4 pages.
Catt, CATR "Cell Type Based Handover for Hetnet", 3GPP TSG RAN WG2 Meeting #79, R2-123343, Qingdao, P.R. China, Aug. 13-17, 2012, 4 pages.
Extended European Search Report issued in corresponding European Application No. 13832546.9, dated Apr. 12, 2016, 9 pages.

* cited by examiner

FIG. 4

FIRST EXAMPLE
(NEIGHBOR CELL LIST IN BROADCAST INFORMATION)

```
IntraFreqNeighCellInfo ::=    SEQUENCE {
    physCell              PhysCellId,
    q-OffsetCell          Q-OffsetRange,
    t-ReselectionEUTRA    T-Reselection                      OPTIONAL,
    t-ReselectionEUTRA-SF SpeedStateScaleFactors-vabc        OPTIONAL,
    ...
}
```

FIRST EXAMPLE
(CELL RESELECTION CONTROL BY MOBILE TERMINAL)

FIG. 6

FIRST EXAMPLE
(EXAMPLE OF NEIGHBOR CELL LIST)

|  | PhysCellId | q-OffsetCell | t-ReselectionEUTRA | t-ReselectionEUTRA-SF |
|---|---|---|---|---|
| MACRO CELL 22a | 1001 | 0dB | 2 seconds | 1.0 |
| MACRO CELL 23a | 1002 | 0dB | 2 seconds | 1.0 |
| MICRO CELL 24b | 2001 | 0dB | 2 seconds | 0.5 |
| MICRO CELL 25b | 2002 | 0dB | 2 seconds | 0.5 |
| PICO CELL 26c | 3001 | 3dB | 7 seconds | 5.0 |
| PICO CELL 27c | 3002 | 3dB | 7 seconds | 5.0 |
| FEMTO CELL 28d | 5001 | 0dB | 7 seconds | 10.0 |
| FEMTO CELL 29d | 5002 | 0dB | 7 seconds | 10.0 |

FIG. 7

SECOND EXAMPLE
(EXAMPLE OF BROADCAST INFORMATION)

| CELL TYPE | t-ReselectionEUTRA | t-ReselectionEUTRA-SF |
|---|---|---|
| MACRO CELL | 2 seconds | 1.0 |
| MICRO CELL | 2 seconds | 0.5 |
| PICO CELL | 7 seconds | 2.0 |
| FEMTO CELL | 7 seconds | 4.0 |

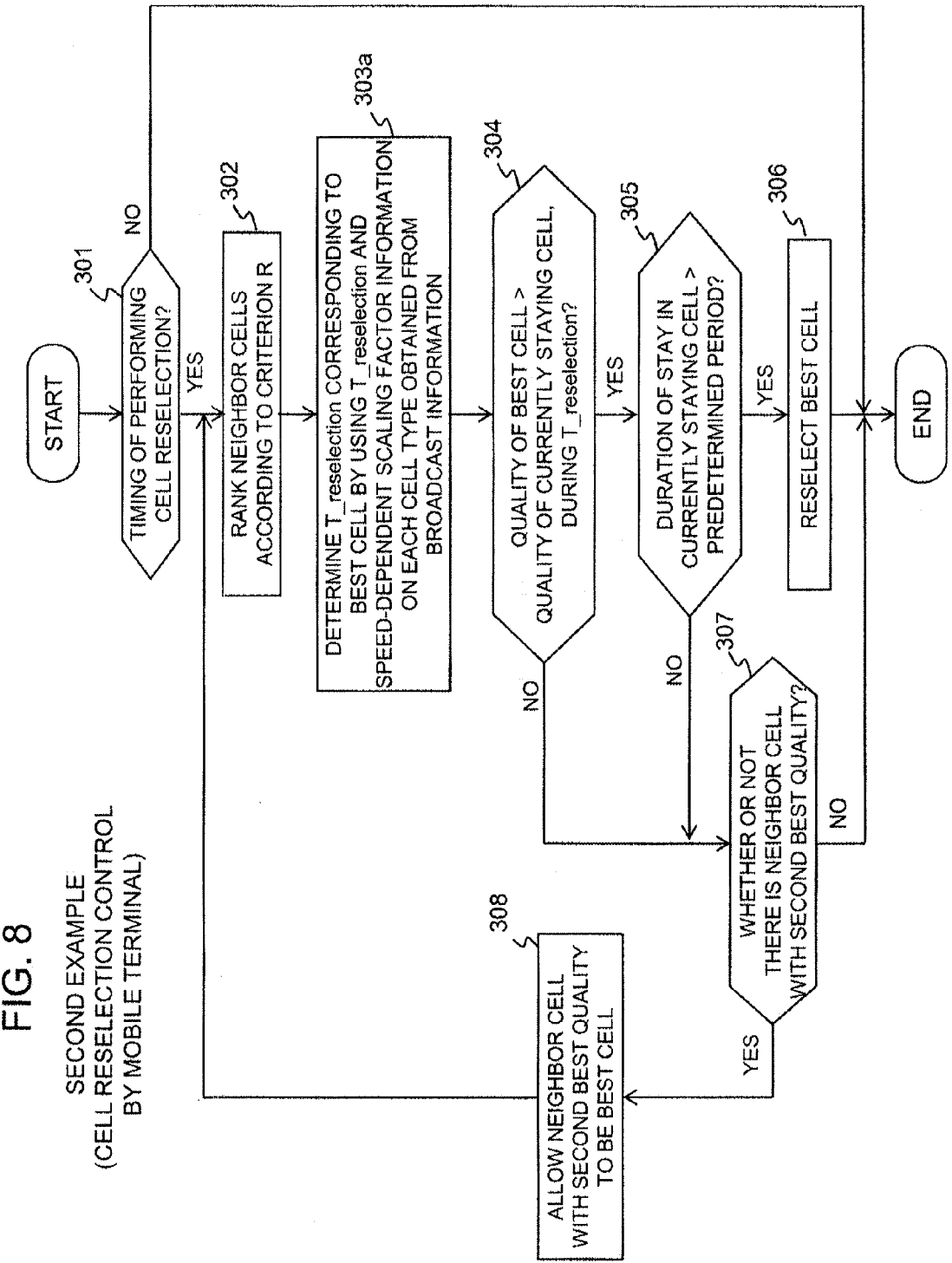

FIG. 9A

THIRD EXAMPLE
(CELL TYPE ESTIMATION BASED ON TRANSMISSION POWER BROADCAST)

| PhysCellId | Reference Power | ESTIMATED CELL TYPE |
|---|---|---|
| 1000 | 10dBm | PICO CELL |
| 1001 | 1dBm | FEMTO CELL |
| 1002 | 1dBm | FEMTO CELL |
| 1003 | 30dBm | MACRO CELL |

FIG. 9B

THIRD EXAMPLE
(BROADCAST INFORMATION FROM BASE STATION)

| CELL TYPE | ADJUSTMENT FACTOR |
|---|---|
| MACRO CELL | 1 |
| MICRO CELL | 1 |
| PICO CELL | 3 |
| FEMTO CELL | 10 |

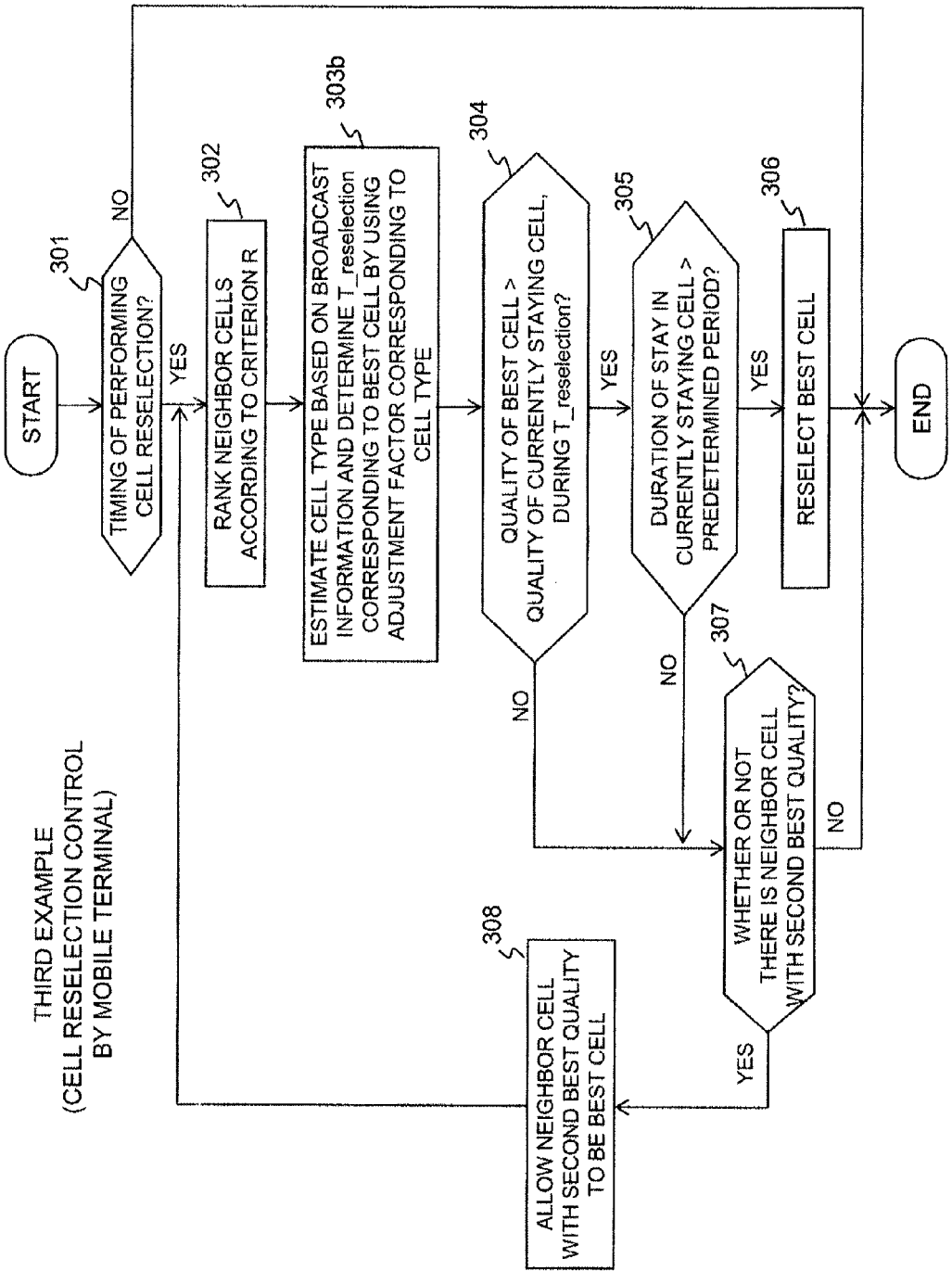

FIG. 11
THIRD EXAMPLE
(EXAMPLE OF ADJUSTMENT OF CELL RESELECTION TIMER)

| PhysCellId | Reference Power | ESTIMATED CELL TYPE | ADJUSTMENT FACTOR | ADJUSTED T_reselection (sec.) |
|---|---|---|---|---|
| 1000 | 10dBm | PICO CELL | 3 | 9 |
| 1001 | 1dBm | FEMTO CELL | 10 | 30 |
| 1002 | 1dBm | FEMTO CELL | 10 | 30 |
| 1003 | 30dBm | MACRO CELL | 1 | 3 |

FIG. 12

FOURTH EXAMPLE
(CELL/FREQUENCY-PRIORITY ASSIGNMENT INFORMATION)

| CELL TYPE | FREQUENCY (MHz) | PRIORITY |
|---|---|---|
| MACRO CELL | 2110 | 1 |
| MICRO CELL | 2120 | 3 |
| PICO CELL | 2150 | 5 |
| FEMTO CELL | 2170 | 7 |

FIG. 14

FIFTH EXAMPLE
(CELL TYPE-PRIORITY ASSIGNMENT INFORMATION)

| CELL TYPE | CELL ID | FREQUENCY (M Hz) | PRIORITY |
|---|---|---|---|
| MACRO CELL | 4000 | 2110 | 1 |
| MICRO CELL | 4001 | 2110 | 3 |
| PICO CELL | 4002 | 2110 | 5 |
| FEMTO CELL | 4003 | 2110 | 7 |

FIG. 15

SIXTH EXAMPLE
(NEIGHBOR CELL LIST)

```
CellsToAddMod ::=    SEQUENCE {
  cellIndex      INTEGER (1..maxCellMeas),
  physCellId     PhysCellId,
  cellIndividualOffset   Q-OffsetRange,
  timeToTrigger      TimeToTrigger         OPTIONAL,
  timeToTrigger-SF   SpeedStateScaleFactors-vabc  OPTIONAL
}
```

FIG. 17

SIXTH EXAMPLE
(EXAMPLE OF NOTIFICATION INFORMATION)

| CELL TYPE | PhysCellId | timeToTrigger | timeToTrigger-SF |
|---|---|---|---|
| MACRO CELL 22a | 1001 | 2 seconds | 1.0 |
| MACRO CELL 23a | 1002 | 2 seconds | 1.0 |
| PICO CELL 26c | 3001 | 6 seconds | 5.0 |
| PICO CELL 27c | 3002 | 6 seconds | 5.0 |
| FEMTO CELL 28d | 5001 | 6 seconds | 10.0 |
| FEMTO CELL 29d | 5002 | 6 seconds | 10.0 |

MOBILITY CONTROL METHOD AND DEVICE IN MOBILE COMMUNICATION NETWORK

CROSS-REFERENCE TO RELATED APPLICATIONS

This application is a national stage application of International Application No. PCT/JP2013/005038 entitled "Mobility Control Method and Device In Mobile Communication Network," filed on Aug. 27, 2013 which claims the benefit of the priority of Japanese Patent Application No. 2012-189474, filed on Aug. 30, 2012, the disclosures of each of which are hereby incorporated by reference in their entirety.

TECHNICAL FIELD

The present invention relates to mobility control in a mobile communication network and, more particularly, to a mobility control method and device in a heterogeneous network having multiple cells of different cell sizes.

BACKGROUND ART

In a mobile communication network for mobile telephones or the like, cells managed by radio base stations have various sizes. These cells are named according to the radiuses of cells; namely, cells not smaller than 1 km in radius are referred to as macro cells, cells about 0.5 to 1.5 km in radius, pico cells, and cells about 10 to 500 m in radius, femto cells. Of them, femto and pico cells are also referred to as small cells, and hereinafter the term "small cell" will be used unless otherwise noted.

The setup of a small cell makes it possible to achieve coverage compensation and capacity increase. Coverage compensation is required to cover an area where radio waves do not reach because of buildings and the like within a macro cell. For example, sufficient mobile communication services can be provided by placing a small cell base station inside a building where radio waves from a macro cell base station do not reach due to penetration losses caused by building walls and the like. Moreover, capacity increase is required to handle mobile traffic rapidly increasing due to the popularization of mobile phones, particularly, smart phones. With small cells, the number of users that can be accommodated per cell is lessened by shortening the cell radius, whereby the overall capacity can be increased.

As described above, the deployment of small cells makes it possible to achieve coverage compensation and capacity increase. However, in a system where macro and small cells coexist, a problem arises that the probability of radio wave interference increases, leading to degradation in communication quality. To address such a problem, heterogeneous networks employ such a configuration that small cells are entrusted with hot spots and radio wave-unreachable areas while macro cells cover other areas, with appropriate interference control, power control and the like being performed.

Further, as to cell reselection control in mobile communication networks, NPLs 1 to 4 describe technologies for control at the times of cell reselection and handover. NPLs 1 and 2 define T_reselection, which is a cell reselection timer value. NPL 3 defines 31 seconds as the maximum value of the T_reselection timer in 3G networks and NPL 4 defines 7 seconds as the maximum value of the T_reselection timer in LTE networks. Accordingly, in LTE networks, if the T_reselection timer is set to a maximum value of 7 seconds, cell reselection determination can be performed by measuring radio wave quality in another cell during 7 seconds, and if radio wave quality in the other cell is good, cell reselection can be executed. Furthermore, if Speed dependent Scaling Factor for Treselection defined in NPLs 1 and 3 is used, the determination time for cell reselection, T_reselection, can be varied depending on the speed of a mobile station.

Further, in inter-cell handover, the measurement time for measurement reporting (Time To Trigger) can be varied by applying SpeedStateScaleFactors to a mobile station moving at high speed (NPLs 3 and 4).

CITATION LIST

Non-Patent Literature

[NPL 1]
   3GPP TS25.304 Ver10.4.0
[NPL 2]
   3GPP TS36.304 Ver10.4.0
[NPL 3]
   3GPP TS25.331 Ver11.0.0
[NPL 4]
   3GPP TS36.331 Ver10.5.0

SUMMARY OF INVENTION

Technical Problem

However, in a system such as a heterogeneous network where macro and small cells coexist, in general, the smaller the size of a cell, the shorter the duration of a mobile station's stay therein. When a mobile station is moving, the duration of its stay becomes shorter in proportion with the mobility speed. Accordingly, even if a mobile station only passes through a small cell, location registration signaling is created both when it enters the small cell and when it enters again a macro cell. Consequently, if a number of mobile stations create such location registration signaling, a new problem arises that an increase of location registration signals becomes more apparent as the size of a small cell becomes smaller and/or more mobile stations move at high speed. A more detailed description will be given of this problem of the frequent creation of location registration signaling.

First, in mobile communication, the locations of mobile terminals (User Equipment; hereinafter, abbreviated to UE as appropriate) are managed on a location registration area basis. In 3G networks, location areas are used for circuit switching services, and routing areas are used for packet switching services. Moreover, in LTE (Long Term Evolution), a TA list, which includes multiple tracking areas (TAs), is assigned to each UE so that location registration timings can be staggered. Accordingly, a TA list can be regarded as a location registration area.

Assuming that a UE moves at constant speed, the smaller a location registration area, the shorter the duration of the UE's stay therein, and so the location registration signaling of the UE greatly increases, as described above. Supposing a scenario in which a user holding a UE passes through a small cell on foot, a location registration procedure occurs in the small cell when she/he moves from a macro cell to the small cell, and a location registration procedure further occurs in the macro cell when she/he moves from the small cell to the macro cell. Assuming that the small cell is a femto cell, since a femto cell has a radius of a few tens meters, the user moves to another cell only in a few tens seconds without making a call. In a few tens seconds, a UE only can pass through a small cell even if it moves to the small cell and makes location registration. It therefore can be thought that the number of UEs actually using communication services such as voice and packet services shares only a few percent. This only results in an increase in the number of location registrations in small and macro cells.

Although the above-mentioned technologies for control at the times of cell reselection and handover can also be applied to a heterogeneous network, any of them has problems as will be described below and therefore cannot solve the above-described problem of the frequent creation of location registration signaling.

(1) In NPLs 1 to 4, the cell reselection timer (T_reselection) is defined as described above, but only one cell reselection timer is defined for the cell on which the user is staying. That is, a change to a T_reselection for a macro cell affects not only reselection from a macro cell to a small cell but also a time for reselection from a macro cell to a macro cell. As a result, service quality may be degraded at the time of reselection to a macro cell.

(2) As defined in NPLs 1 and 3, the determination time at the time of high-speed movement can be varied by multiplying T_reselection, which is the determination time for cell reselection, by Speed dependent Scaling Factor for Treselection. However, Speed dependent Scaling Factor for Treselection ranges from 0 to 1 in increments of 0.1, and the determination time for cell reselection only can be shortened but cannot be extended. That is, it is impossible to allow a UE moving at high speed to delay starting location registration.

(3) The use of HCS (Hierarchical Cell Structure) defined in NPL 1 makes it possible to allow a UE, when it is in high-speed state, to reselect a cell with a lower HCS priority (HCS_PRIO). For example, in case where a micro cell is assigned HCS_PRIO=1 and a 3G small cell is assigned HCS_PRIO=7, then a UE in still or low-speed state preferentially selects the 3G small cell rather than the macro cell but, when it is in high-speed state, can preferentially select the macro cell so that location registration in the 3G small cell can be avoided.

However, LTE does not define HCS and, instead, employs an absolute priority-based cell reselection mechanism. Accordingly, HCS cannot be applied to reduce location registration signaling in LTE small cells and LTE macro cells. Further, to accomplish mobility with LTE in a 3G network, an LTE-side frequency needs to be broadcast by using broadcast information (SIB19: System Information Block type 19, NPL 3) and the absolute priority-based cell reselection mechanism needs to be introduced also in the 3G network, in which case HCS cannot be used concurrently according to the existing technology (NPL 1). That is, HCS cannot be applied in a 3G network that enables mobility with LTE, and so the problem of the frequent creation of location registration signaling cannot be solved.

(4) The frequent creation of location registration signaling is similarly problematic in handover controlled by a network side. According to NPLs 3 and 4, a common measurement time (Time To Trigger) is used for handover to whichever of a macro cell and a small cell, and SpeedStateScaleFactors are uniformly applied to a UE moving at high speed. However, the values of SpeedStateScaleFactors are not higher than 1 and so cannot make a high-speed UE delay selecting a small cell. Accordingly, a high-speed UE selects any small cell if it determines, within an evaluation time, that the quality of the small cell is high. Hence, UEs moving at high speed cannot reduce the number of handover signals to small cells.

As described above, according to the existing technologies described in NPLs 1 to 4, unrequired location registration signaling and handover signaling to small cells in a heterogeneous network cannot be reduced.

Accordingly, an object of the present invention is to provide a mobility control method and device that can suppress an increase of location registration signaling.

Solution to Problem

A mobility control method according to the present invention is a mobility control method for a mobile terminal in a mobile communication network including cells of multiple types differing in cell size, characterized by comprising: setting mobility determination times for individual neighbor cells or individual neighbor cell types; and performing mobility control by determining whether or not a predetermined mobility criterion remains satisfied during the mobility determination time for a neighbor cell.

A mobility control device according to the present invention is a mobility control device in a mobile communication network including cells of multiple types differing in cell size, characterized by comprising: a mobility determination timer means for setting mobility determination times for individual neighbor cells of a cell on which a mobile terminal is currently staying or for individual neighbor cell types; and a mobility determination control means for performing mobility control by determining whether or not a predetermined mobility criterion remains satisfied during the mobility determination time for a neighbor cell.

A mobility control system according to the present invention is a mobility control system in a mobile communication network including cells of multiple types differing in cell size, comprising: base stations managing the cells; and a mobile station that can move between the cells, characterized in that the mobile station sets mobility determination times for individual neighbor cells of a cell on which it is currently staying or for individual neighbor cell types, and performs mobility control by determining whether or not a predetermined mobility criterion remains satisfied during the mobility determination time for a neighbor cell.

Advantageous Effects of Invention

According to the present invention, an increase of location registration signaling can be suppressed by setting mobility determination times for individual neighbor cells or individual neighbor cell types.

BRIEF DESCRIPTION OF DRAWINGS

FIG. 4 is a diagram showing an example of a neighbor cell list used in a mobility control method according to a first example of the present invention.

FIG. 6 is a diagram schematically showing the contents of the neighbor cell list for describing the cell reselection control operation of the mobile terminal according to the first example.

FIG. 7 is a diagram showing an example of broadcast information used in a mobility control method according to a second example of the present invention.

FIG. 8 is a flowchart showing cell reselection control operation of a mobile terminal according to the second example.

FIG. 9A is a diagram showing an example of cell type estimation in a mobility control method according to a third example of the present invention, and FIG. 9B is a diagram showing an example of broadcast information in the third example.

FIG. 10 is a flowchart showing cell reselection control operation of a mobile terminal according to the third example.

FIG. 11 is a diagram showing an example of adjustment of a cell reselection timer for describing the cell reselection control operation of the mobile terminal according to the third example.

FIG. 12 is a diagram showing an example of cell/frequency and priority assignment information used in a mobility control method according to a fourth example of the present invention.

FIG. 14 is a diagram showing an example of cell type and priority assignment information used in a mobility control method according to a fifth example of the present invention.

FIG. 15 is a diagram showing an example of a neighbor cell list used in a mobility control method according to a sixth example of the present invention.

FIG. 17 is a diagram schematically showing the contents of the neighbor cell list for describing the handover control operation of the mobile terminal according to the sixth example.

DESCRIPTION OF EMBODIMENTS

According to an exemplary embodiment of the present invention, mobility determination times are set for individual neighbor cells or individual cell types, whereby it is possible to avoid unrequired location registration in a cell. The mobility determination time can be set to different values for different cells/cell types, by changing a cell reselection timer (T_reselection), which indicates a determination time for cell reselection, or changing a measurement time for handover condition evaluation (Time To trigger), or the like.

For example, the cell reselection timer is extended according to the mobility speed of a mobile station, whereby, if a neighbor cell is a small cell of a small size, location registration in this cell is delayed so that the mobile station is allowed to pass through it, and consequently the frequent creation of location registration signaling can be avoided. In this event, if a neighbor cell is a macro cell, location registration is executed at normal timing, whereby cell reselection performance will not be affected. Similarly, measurement times for handover condition evaluation (Time To trigger) are set for individual neighbor cells/cell types, whereby handover to and location registration in a small cell can be avoided without affecting handover to a macro cell. Hereinafter, a description will be given of a mobile communication network for implementing a mobility control system according to the present exemplary embodiment, with reference to drawings. Here, to avoid complication, a description will be given of a case as an example where in a heterogeneous network in which macro and small cells neighbor on each other, a mobile terminal located within the macro cell moves while passing through the small cell. However, it is sufficient that the macro and small cells have different cell sizes and neighbor on each other, and the cell deployment shown in FIG. 1 is not a restriction.

Figure 1:
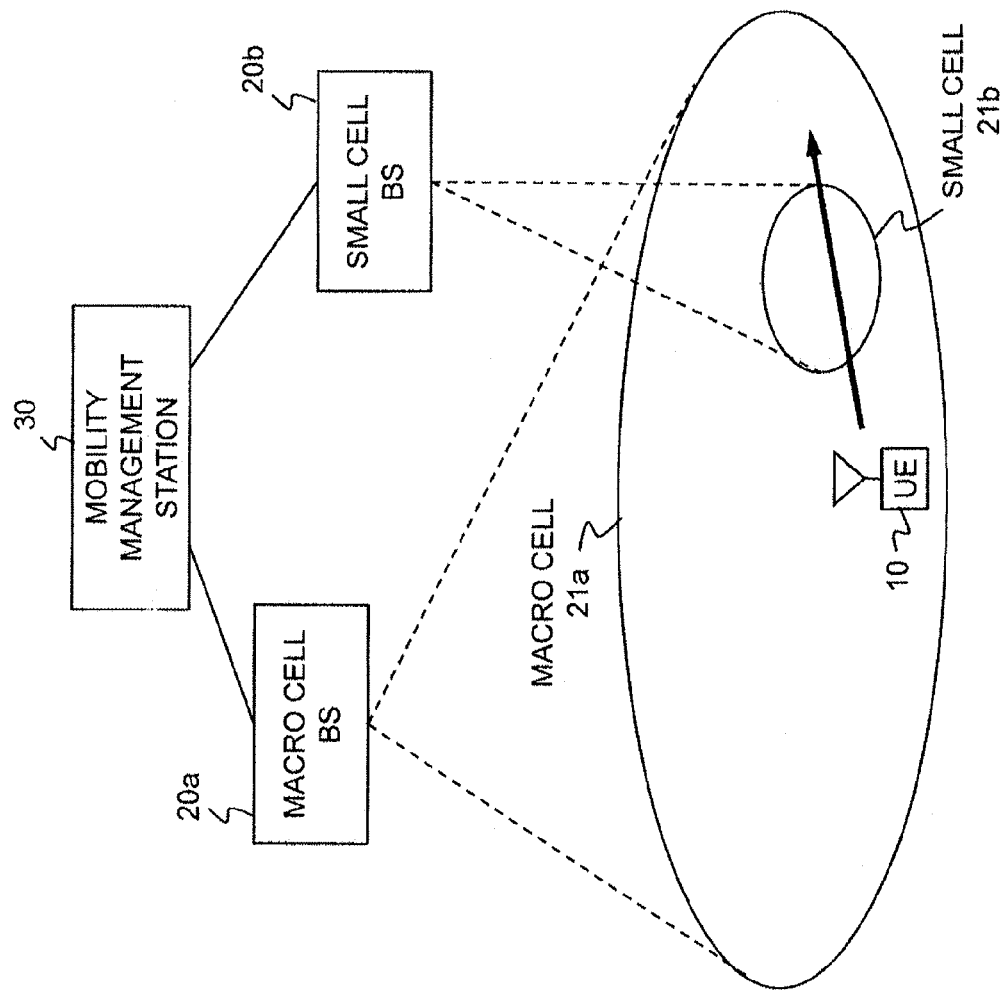
FIG. 1 is a schematic diagram showing an example of a heterogeneous network for implementing a mobility control system according to an exemplary embodiment of the present invention.

Referring to FIG. 1, the heterogeneous network for implementing the present exemplary embodiment includes a mobile terminal 10, a macro cell base station 20a, a small cell base station 20b, and a mobility management station 30. The mobility management station 30 manages the macro cell base station 20a and small cell base station 20b, and the macro cell base station 20a and small cell base station 20b control a macro cell 21a and a small cell 21b, respectively. Note that there may be a plurality of mobile terminals 10, macro cell base stations 20a, and small cell base stations 20b, respectively.

Figure 2:
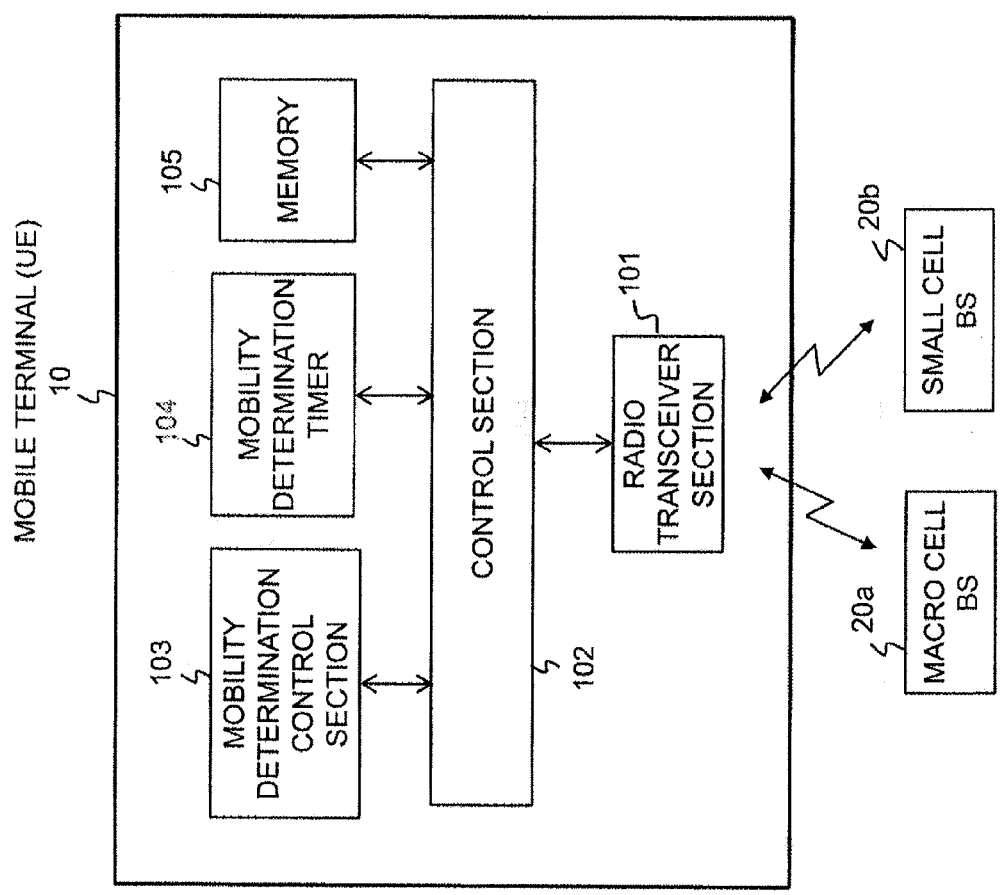
FIG. 2 is a schematic block diagram showing a functional configuration of a mobile terminal according to the present exemplary embodiment.

Referring to FIG. 2, the mobile terminal 10 in the present exemplary embodiment includes a radio transceiver section 101 and a control section 102 and, in addition to them, has functions including a mobility determination control section 103, a mobility determination timer 104, and a memory 105. The radio transceiver section 101 can transmit and receive radio signals to/from the base stations (macro cell base station 20a, small cell base station 20b) and, for example, receives broadcast information from a base station and transmits a RRC (Radio Resource Control) message and the like to a base station. The control section 102 performs control for bearer establishment, radio quality measurement, handover and the like in accordance with an instruction in a message (e.g., RRC message) from the network. According to the present exemplary embodiment, the mobility determination control section 103 performs mobility determination control, using the mobility determination timer 104 and memory 105, which will be described later. Note that the functions (such as undermentioned cell reselection control and handover control) of the control section 102, mobility determination control section 103, and mobility determination timer 104 can also be implemented by executing programs stored in a storage device (not shown) on a CPU (Central Processing Unit) of the mobile terminal 10.

Figure 3:
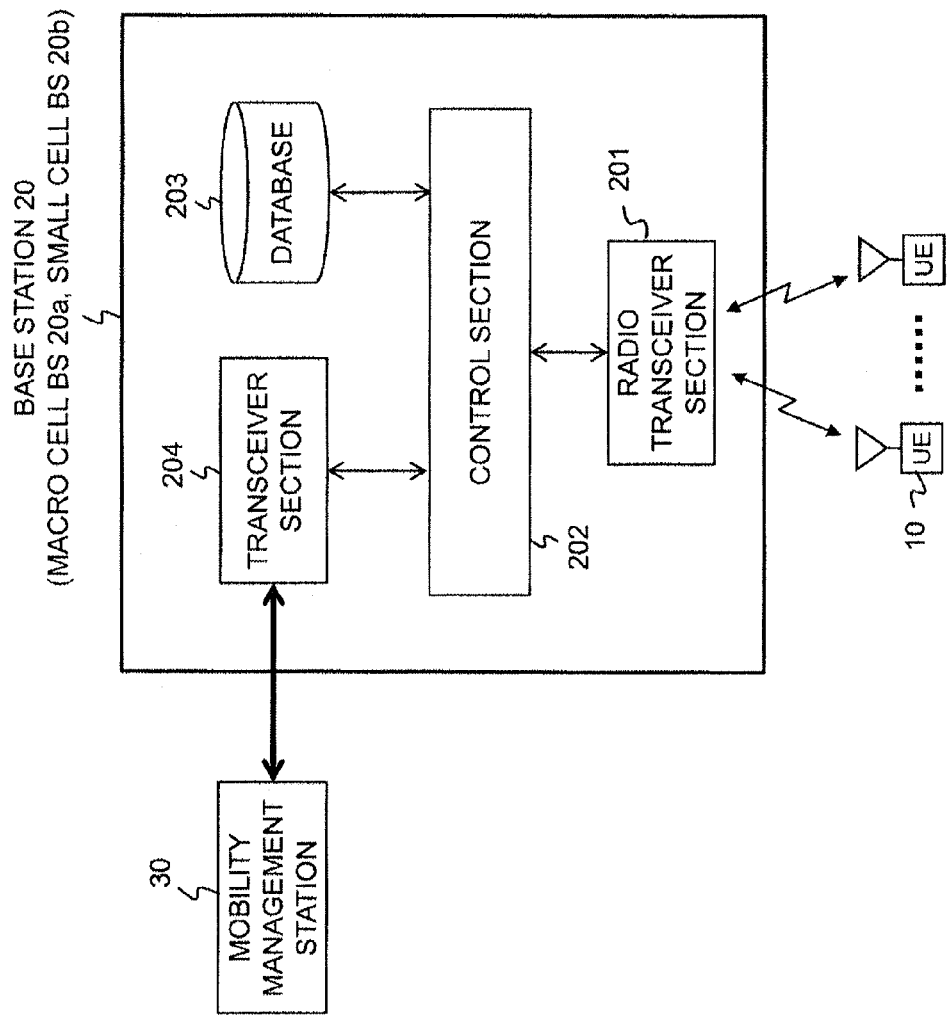
FIG. 3 is a schematic block diagram showing a functional configuration of a base station according to the present exemplary embodiment.

As shown in FIG. 3, the macro cell base station 20a and small cell base station 20b have the same basic functional configuration although some of their radio characteristics such as maximum transmission power and cell radius are different. Accordingly, a description will be given, collectively denoting these base stations 20a and 20b as base station 20, and their radio areas, the cells 21a and 21b, as cell 21.

Referring to FIG. 3, the base station 20 includes a radio transceiver section 201 for performing radio communication with the mobile terminal 10, a control section 202 for performing overall control of the base station 20, a database 203 storing configuration information and the like, and a transceiver section 204 for performing communication with the mobility management station 30. The control section 202 performs control for RRC connection setup, bearer establishment, handover execution and the like in accordance with a RRC message from the mobile terminal 10. Further, the control section 202 transmits and receives messages to/from the higher-order mobility management station 30 via the transceiver section 204. The database 203 stores office data as well as configuration information and the like set by an operator. Note that when the mobile station 20 is the small cell base station 20b and the small cell is a femto cell, then the femto cell may be in open mode, or hybrid access mode, or closed mode. Note that the functionality of the control section 202 can also be implemented by executing programs stored in a storage device (not shown) on a CPU (Central Processing Unit) of the base station 20.

Hereinafter, a detailed description will be given of a mobility control method and system according to examples of the present invention with the above-described configurations of the system, mobile terminal, and base station, with reference to drawings.

1. First Example

According to a first example of the present invention, a cell reselection timer T_reselection is set for each neighbor cell. For example, different cell reselection timers T_reselection are broadcast depending on whether a neighbor cell is a macro cell or a small cell, and a mobile terminal applies the broadcast cell reselection timer T_reselection. Further, according to the present example, the range of speed-dependent scaling factor values is extended, whereby the mobile terminal can determine a cell reselection timer T_reselection according to the mobility speed. The cell reselection timer T_reselection is thus set, whereby the start of location registration is delayed when a neighbor cell has a small cell size and/or when a mobile terminal is moving at high speed, and location registration signaling to small cells thus can be reduced. Hereinafter, the present example will be described in detail.

1.1) Neighbor Cell List

The base station 20 periodically broadcasts broadcast information, and the mobile terminal 10 located within the relevant cell 21 performs cell reselection based on cell reselection timer information included in the broadcast information. The broadcast information includes a neighbor cell list, which indicates cell reselection timers T_reselection for individual neighbor cells of the cell 21. In the present example, SIB4 (SystemInformationBlockType4), which is broadcast information for controlling same-frequency cell reselection in a LTE network, includes a neighbor cell list (IntraFreqNeighCellInfo) having a format as shown in FIG. 4.

Referring to FIG. 4, introduced in the same-frequency neighbor cell list (IntraFreqNeighCellInfo) are t-ReselectionEUTRAs, which are cell reselection timers, and t-ReselectionEUTRA-SFs, which are speed-dependent scaling factors, in addition to the identification information of neighbor cells and the like. Here, the t-ReselectionEUTRA-SFs, the speed-dependent scaling factors, are an extended version of SpeedStateScaleFactors-vabc, and their values range not only from 0 to 1, but the range thereof is extended beyond 1. For example, the values of the speed-dependent scaling factor t-ReselectionEUTRA-SF can be defined as values in increments of 0.25 within a range from a minimum of 0.25 to a maximum of 100. Thus, for the mobile terminal 10 moving at high speed, the cell reselection timer T_reselection can be extended 100 times at maximum.

Similarly, the above-described cell reselection timer and speed-dependent scaling factor can also be introduced in SIB5, which includes a different-frequency cell list, in SIB6, which includes a UTRA (Universal Terrestrial Radio Access, hereinafter, abbreviated to UTRA) neighbor cell list, in SIB7, which includes a GERAN (GSM/EDGE Radio Access Network) neighbor cell list, and in SIB8, which includes a CDMA2000 neighbor cell list.

1.2) Cell Reselection Control by Mobile Terminal

When receiving broadcast information (SIB4) including a neighbor cell list as described above from the base station 20, the control section 102 of the mobile terminal 10 stores the neighbor cell list included in the broadcast information in the memory 105 and performs cell reselection control, which will be described next. Hereinafter, cell reselection control will be described with reference to FIGS. 2 and 5.

Figure 5:
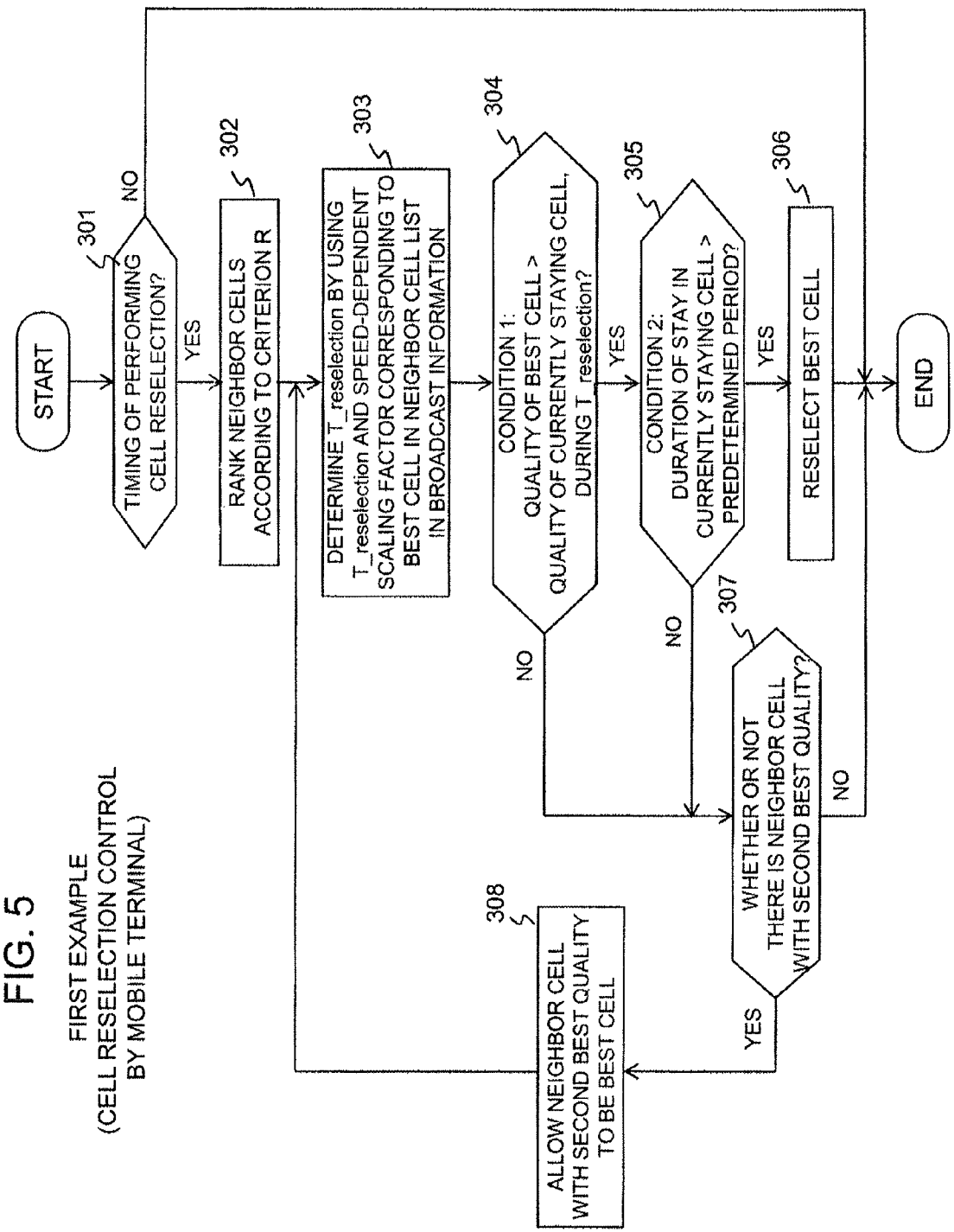
FIG. 5 is a flowchart showing cell reselection control operation of a mobile terminal according to the first example.

Referring to FIG. 5, the mobility determination control section 103 of the mobile terminal 10, when detecting a timing of performing cell reselection (Operation 301; YES), refers to the memory 105 and determines a best cell by ranking the neighbor cells in descending order of quality in accordance with criterion R (cell-ranking criterion R defined in 3GPP TS36.304) (Operation 302).

After determining the best cell, the mobility determination control section 103 reads from the neighbor cell list a cell reselection timer (t-ReselectionEUTRA) corresponding to the best cell and one speed-dependent scaling factor (t-ReselectionEUTRA-SF) corresponding to the mobility speed of the mobile terminal, and calculates a cell reselection timer (T_reselection) for the best cell (Operation 303). Specifically, a T_reselection for the best cell is calculated by multiplying the t-ReselectionEUTRA by the t-ReselectionEUTRA-SF and set on the mobility determination timer 104.

Subsequently, the mobility determination control section 103 determines whether or not the best cell satisfies a predetermined mobility criterion (Operations 304 and 305). That is, it is determined whether or not the quality of the best cell exceeds the quality of a currently staying cell during the calculated T_reselection (Condition 1), and whether or not staying on the currently staying cell lasts over a predetermined period of time (one second, according to 3GPP TS36.304, 5.2.4.6) (Condition 2) (Operations 304 and 305). If both Conditions 1 and 2 are satisfied (Operation 304; YES, Operation 305; YES), the mobility determination control section 103 performs cell reselection to this best cell (Operation 306) and completes processing.

Any one of Conditions 1 and 2 is not satisfied (Operation 304; NO, or Operation 305; NO), the mobility determination control section 103 refers to a result of ranking the neighbor cells and determines whether or not there is a neighbor cell having second best quality (Operation 307). If there is such a neighbor cell (Operation 307; YES), this neighbor cell is made to be a best cell (Operation 308), and the process goes back to Operation 303 for determining a T_reselection. The above-described processing is repeated until a new best cell is reselected (Operation 306) or until all cells in the neighbor cell list are subjected to determination (Operation 307; NO).

Note that the procedure shown in FIG. 8 has been described taking a case of broadcast information SIB4 shown in FIG. 7 as an example but can be similarly applied even in case of broadcast information SIB5, SIB6, SIB7 or SIB 8.

1.3) Concrete Example

Next, concrete operation of the mobile terminal 10 located in the macro cell 21a will be described, taking a case as an example where a neighbor cell list as shown in FIG. 6 is broadcast.

Referring to FIG. 6, it is assumed that macro cells 22a and 23a, micro cells 24b and 25b, pico cells 26c and 27c, and femto cells 28d and 29d neighbor on the macro cell 21a on which the mobile terminal 10 is currently staying. "PhysCellId" is an abbreviation of Physical Cell ID and is identification information (ID) for identifying a cell at the physical channel level. "q-OffsetCell" is an offset to a cell and is for virtually increasing the cell radius to thereby allow the mobile terminal 10 to easily reselect the cell. Such technology is also referred to as Cell Range Expansion, which is a technology for offloading user traffic in macro cells. In this example, a q-OffsetCell for the pico cells 26c and 27c is set to a large value for offloading. Note that a description of the technology of Cell Range Expansion will be omitted because it is well known.

Further, in the present example, t-ReselectionEUTRAs for the individual neighbor cells are notified from the base station side to a mobile terminal. In the example shown in FIG. 6, a t-ReselectionEUTRA value (7 seconds), which is longer than a t-ReselectionEUTRA value (2 seconds) set for the macro and micro cells, is set for the pico and femto cells. That is, the cell reselection timer is set to a larger value for a cell smaller than a micro cell, whereby the timing of a mobile terminal for reselection to a small cell is delayed, and consequently it is possible to reduce location registration signaling to small cells. The possibility of reselecting a pico cell or femto cell is reduced as the mobility speed of the mobile terminal 10 increases. Conversely, for a mobile terminal staying in the vicinity of a pico cell for a while (moving at low speed), it is possible to achieve the traffic offloading effect of Cell Range Expansion because the q-OffsetCell value is set large. Similarly, since a reselection timer for a femto cell is also set long, only mobile terminals staying in the femto cell for a while are allowed for location registration. As for mobile terminals that quickly pass through, location registration signaling is not started because they pass through before the timeout of the reselection timer for the femto cell occurs. Thus, it is possible to obtain the effect of a reduction of location registrations in small cells such as femto cells and pico cells.

Further, according to the present example, t-ReselectionEUTRA-SFs for the individual neighbor cells are notified. According to the example shown in FIG. 6, t-ReselectionEUTRA-SF=0.5 is set for the micro cells, t-ReselectionEUTRA-SF=5.0, for the pico cells with a smaller size, and t-ReselectionEUTRA-SF=10.0, for the femto cells with a further smaller size. For example, in case of the mobile terminal 10 moving at high speed in the micro cell 24b or 25b, the speed-dependent scaling factor is applied so that the cell reselection timer is shortened to t-ReselectionEUTRA (2 seconds)×t-ReselectionEUTRA-SF (0.5)=1 second. In case of the mobile terminal 10 moving at high speed in the pico cell 26c, if the speed-dependent scaling factor is applied, the cell reselection timer is extended to t-ReselectionEUTRA (7 seconds)×t-ReselectionEUTRA-SF (5.0)=35 seconds. Accordingly, when moving at high speed in the pico cell 26c or 27c, the mobile terminal is highly likely to pass through it before cell reselection to the pico cell takes place, and consequently it is possible to reduce the creation of location registration signaling. The speed-dependent scaling factors are set for the individual neighbor cells in this manner, whereby the mobility speed-dependent response performance of cell reselection can be changed only for a specific neighbor cell.

Note that although an example of same-frequency cell reselection within LTE (intra LTE) is mainly described in FIG. 6, similar effects can be obtained in cases of different-frequency cell reselection and UTRA, GERAN, and CDMA2000 cell reselection, by using the respective broadcast information SIB5, SIB6, SIB7, and SIB8 and introducing cell reselection timers T_reselection and/or speed-dependent scaling factors for individual neighbor cells, as described already. Moreover, T_reselections and/or speed-dependent scaling factors for individual neighbor cells may be introduced into other broadcast information (SIB). Furthermore, T_reselections and/or speed-dependent scaling factors for individual neighbor cells may be notified to each mobile terminal individually by using a RRC message or the like other than broadcast information.

1.4) Effects

As described above, according to the first example of the present invention, cell reselection timers T_reselection and/or speed-dependent scaling factors for individual neighbor cells are introduced, whereby a reduction of location registrations in small cells can be achieved without impairing the effects of Cell Range Expansion and others. Further, it is possible to achieve cell reselection following high-speed movement, targeting only a specific neighbor cell.

2. Second Example

In the above-described first example, a cell reselection timer T_reselection and/or speed-dependent scaling factor is introduced for each neighbor cell. In a second example of the present invention, a cell reselection timer T_reselection and/or speed-dependent scaling factor is introduced for each cell type. Cell types can be classified on a cell size basis. The types have, as described already, macro cell, micro cell, and small cell in descending order of cell size, and small cells are further classified into the types of pico cell and femto cell.

2.1) Broadcast Information

The base station 20 periodically broadcasts broadcast information, and the mobile terminal 10 having received the broadcast information performs cell reselection based on cell reselection timer information on each cell type included in the broadcast information. The broadcast information includes cell reselection timers T_reselection and speed-dependent scaling factors set for individual cell types.

FIG. 7 shows an example of the broadcast information in the second example. Similarly to the example used in the first example (FIG. 6), a t-ReselectionEUTRA value (7 seconds), which is longer than a t-ReselectionEUTRA value (2 seconds) set for macro cell and micro cell, is set for pico cell and femto cell. Moreover, t-ReselectionEUTRA-SF=0.5 is set for micro cell, t-ReselectionEUTRA-SF=2.0, for pico cell, which is smaller in size, and t-ReselectionEUTRA-SF=4.0, for femto cell, which is further smaller.

2.2) Cell Reselection Control by Mobile Terminal

When receiving broadcast information as described above from the base station 20, the control section 102 of the mobile terminal 10 stores the broadcast information in the memory 105 and performs cell reselection control as shown in FIG. 8. The flow shown in FIG. 8 is basically the same as the flow shown in FIG. 5, but Operation 303a is different. The other Operations are the same as those of FIG. 5 and therefore are given the same reference signs as in FIG. 5, and a description thereof will be omitted.

Referring to FIG. 8, the mobility determination control section 103, after having determined a best cell (Operation 302), reads from the memory 105 a cell reselection timer (t-ReselectionEUTRA) and one speed-dependent scaling factor (t-ReselectionEUTRA-SF) corresponding to the mobility speed of the mobile terminal, based on the cell type of the best cell, and calculates a cell reselection timer (T_reselection) for the best cell (Operation 303a). Specifically, a T_reselection for the best cell is calculated by multiplying the t-ReselectionEUTRA by the t-ReselectionEUTRA-SF and set on the mobility determination timer 104. The Operations thereafter are as described in FIG. 5.

2.3) Concrete Example

Taking a case as an example where information as shown in FIG. 7 is broadcast, for example, if the mobile terminal 10 stays in the vicinity of a micro cell longer than its t-ReselectionEUTRA, 2 seconds, cell reselection to this micro cell is performed and location registration procedure is executed, so that communication services are allowed in the micro cell. However, in the vicinity of a small cell with a smaller size than that of a micro cell, cell reselection to this pico cell is not performed unless a stay there lasts over its t-ReselectionEUTRA, 7 seconds.

Moreover, for a mobile terminal moving at high speed, since a speed-dependent scaling factor is applied as described already, cell reselection does not take place unless the mobile terminal 10 stays in the vicinity of a small cell longer than 14 seconds (=7 seconds×2.0). Accordingly, when moving in a small cell at high speed, a mobile terminal is highly likely to pass through it before cell reselection to the small cell takes place, and consequently it is possible to reduce the creation of location registration signaling. Speed-dependent scaling factors are set for the individual cell types in this manner, whereby the mobility speed-dependent response performance of cell reselection can be changed only for a specific cell type.

Note that although an example of same-frequency cell reselection within LTE (intra LTE) is mainly described in FIG. 7, similar effects can be obtained in cases of different-frequency cell reselection and UTRA, GERAN, and CDMA2000 cell reselection, by using the respective broadcast information SIB5, SIB6, SIB7, and SIB8 and introducing cell reselection timers T_reselections and/or speed-dependent scaling factors for individual cell types, as described already. Moreover, T_reselections and/or speed-dependent scaling factors for individual cell types may be introduced into other broadcast information (SIB). Furthermore, T_reselections and/or speed-dependent scaling factors for individual cell types may be notified to each mobile terminal individually by using a RRC message or the like other than broadcast information.

2.4) Effects

According to the second example of the present invention, since T_reselection timers and speed-dependent scaling factors can be set for individual cell types, cell reselection to a small cell such as a pico cell, femto cell or the like can be delayed without affecting cell reselection to, for example, a macro cell. Accordingly, a reduction of location registrations in small cells can be achieved without impairing the effects of Cell Range Expansion and others, as in the first example. Further, it is possible to achieve cell reselection following high-speed movement, targeting only a specific neighbor cell.

Moreover, according to the second example, since cell reselection timers T_reselection and speed-dependent scaling factors not for individual neighbor cells but for individual cell types are broadcast, the size of broadcast information can be made smaller, so that traffic volume is reduced to allow efficient transmission of broadcast information.

3. Third Example

According to a third example of the present invention, a base station broadcasts transmission power information or cell sizes (cell radiuses), whereby a mobile terminal dynamically calculates a scaling factor for each neighbor cell and applies them to a cell reselection timer T_reselection.

3.1) Broadcast Information

The base station 20 periodically broadcasts broadcast information, and the mobile terminal 10 having received the broadcast information estimates a cell type from the broadcast information and determines an adjustment factor. In case of LTE, transmission power information (reference power information) is notified to a mobile terminal as common radio resource information by using SIB2. In general, the larger the radius of a cell, the stronger the transmission power (reference power) of a base station. Accordingly, the mobile terminal side can estimate a cell type from reference power information. An adjustment factor to be applied is determined based on the estimated cell type, and a cell reselection timer T_reselection is adjusted. Note that it is assumed that the reselection timer T_reselection is broadcast as 3 seconds in a macro cell by using SIB2.

It is assumed that neighbor cells of some macro cell have physical cell identifiers (PhysCellIDs) 1000 to 1003 as shown in FIG. 9A and that their respective transmission power (reference power) information is broadcast. In this case, the mobile terminal 10 estimates the cell types of these neighbor cells based on the transmission power (reference power). Here, a cell of 30 dBm, which is the largest transmission power (reference power), is estimated to be a macro cell, a cell of 1 dBm, which is the smallest transmission power (reference power), is estimated to be a femto cell, and a cell of middle transmission power (reference power) therebetween is estimated to be a pico cell.

A cell type can also be estimated from a cell size when not transmission power information (reference power information) but cell sizes are broadcast. Moreover, in case of a femto cell, since CSG (Closed Subscriber Group) is applied in some cases, the type "femto cell" can be determined if a CSG ID is assigned.

A base station broadcasts combinations of cell types and adjustment factors as shown in FIG. 9B. If the mobile terminal 10 can estimate a cell type, it can obtain a corresponding adjustment factor, which is applied to the broadcast cell reselection timer T_reselection (here, 3 seconds), whereby a cell reselection timer suitable for the cell type can be set.

3.2) Cell Reselection Control by Mobile Terminal

When receiving broadcast information as described above from the base station 20, the control section 102 of the mobile terminal 10 stores the broadcast information in the memory 105 and performs cell reselection control as shown in FIG. 10. The flow shown in FIG. 10 is basically the same as the flow shown in FIG. 5, but Operation 303*b* is different. The other Operations are the same as those of FIG. 5 and therefore are given the same reference signs as in FIG. 5, and a description thereof will be omitted.

Referring to FIG. 10, the mobility determination control section 103, after having determined a best cell (Operation 302), estimates its cell type from the transmission power (reference power) information on this best cell and adjusts a broadcast cell reselection timer (t-ReselectionEUTRA) by using an adjustment factor corresponding to the estimated cell type, thereby calculating a cell reselection timer (T_reselection) for the best cell (Operation 303*b*). Specifically, a T_reselection for the best cell is calculated by multiplying the t-ReselectionEUTRA by the adjustment factor and set on the mobility determination timer 104. Note that it is also possible that one speed-dependent scaling factor (t-Reselection-EUTRA-SF) corresponding to the mobility speed of the mobile terminal is read from the memory 105 and used to further change the cell reselection timer (T_reselection) for the best cell, as described already. The Operations thereafter are as described in FIG. 5.

3.3) Concrete Example

Next, concrete operation of the mobile terminal 10 will be described, taking a case as an example where information as shown in FIG. 9 is broadcast.

Referring to FIG. 11, it is assumed that four cells of PhysCellIds 1000 to 1003 neighbor on a cell on which the mobile terminal 10 is staying and that their cell types estimated from their respective transmission power information are pico cell, femto cell, femto cell, and macro cell, respectively. In this case, for the macro cell, since the adjustment factor is 1, a broadcast t-ReselectionEUTRA=3 seconds, as it is, becomes its cell reselection timer (T_reselection). For the pico cell, since the adjustment factor is 3, 3 seconds×3=9 seconds is its cell reselection timer (T_reselection) adjusted, and for the femto cells, since the adjustment factor is 10, 3 seconds× 10=30 seconds is their cell reselection timer (T_reselection) adjusted.

Accordingly, for example, if the mobile terminal 10 stays in the vicinity of the pico cell longer than 9 seconds, cell reselection to this pico cell takes place, and location registration procedure is executed to allow communication services in the pico cell. However, in the vicinity of a femto cell with a smaller size than that of a pico cell, cell reselection does not take place unless a stay there lasts over 30 seconds. Accordingly, the response performance of cell reselection can be changed only for a cell of a specific type by setting adjustment factors according to cell types.

Moreover, for a mobile terminal moving at high speed, since a speed-dependent scaling factor is applied as described already, cell reselection does not take place when the mobile terminal 10 stays in the vicinity of a small cell unless the stay lasts a further longer time. Accordingly, when moving in a small cell at high speed, a mobile terminal is highly likely to pass through it before cell reselection to the small cell takes place, and consequently it is possible to reduce the creation of location registration signaling. Speed-dependent scaling factors are set for the individual cell types in this manner, whereby the mobility speed-dependent response performance of cell reselection can be changed only for a specific cell type.

Note that although an example of same-frequency cell reselection within LTE (intra LTE) is mainly described in FIG. 11, similar effects can be obtained in cases of different-frequency cell reselection and UTRA, GERAN, and CDMA2000 cell reselection, by using the respective broadcast information SIB5, SIB6, SIB7, and SIB8, estimating a cell type based on reference power or a cell size in the broadcast information, and using a corresponding adjustment factor, as described already. Further, the present example can be applied similarly to UTRA and other radio access systems. Furthermore, a cell type may be estimated based on reference power or a cell size by individually using a RRC message or the like for each mobile terminal, other than broadcast information.

3.4) Effects

According to the third example of the present invention, a cell type is estimated by using broadcast information including transmission power information (or cell sizes), adjustment factors and the like from a base station, and T_reselection timers and/or speed-dependent scaling factors can be set by using the adjustment factors for individual cell types. Thus, cell reselection to a small cell such as a pico cell or femto cell can be delayed without affecting cell reselection to, for example, a macro cell. Accordingly, a reduction of location registrations in small cells can be achieved without impairing the effects of Cell Range Expansion and others, as in the first example. Further, it is possible to achieve cell reselection following high-speed movement, targeting only a specific neighbor cell.

Moreover, according to the third example, since transmission power information (or cell sizes) and adjustment factors not for individual neighbor cells but for individual cell types are broadcast, the size of broadcast information can be made smaller, so that traffic volume is reduced to allow efficient transmission of broadcast information.

4. Fourth Example

In a fourth example of the present invention, control is performed such that a mobile terminal moving at high speed selects a lower-priority frequency (cell) in the absolute priority-based frequency reselection mechanism. Thereby, it is possible to reduce the possibility of reselecting a small cell at the time of high-speed movement.

4.1) Broadcast Information

In the absolute priority-based frequency reselection mechanism, frequencies differing with cell types are used, and different priorities are assigned to the different frequencies (cell types). A method for assigning priorities depends on a policy of an operator. For example, if an attempt is made to have mobile terminals gather in small cells, a higher priority is assigned to a cell of a smaller size. The lowest priority 1 is assigned to macro cells, and as for cells ranging from micro cell to femto cell, larger priorities are assigned to them as they have smaller sizes, as shown in FIG. 12. Accordingly, when a mobile terminal staying on a micro cell stays in the vicinity of a pico cell, the mobile terminal performs cell reselection to the pico cell.

However, when the mobile terminal 10 is moving at high speed, it only passes through a cell of a small cell size in many cases as described already, in which case it is preferable that cell reselection be avoided. Accordingly, the mobility determination control section 103 of the mobile terminal according to the fourth example of the present invention performs control such as not to select a high-priority cell (frequency) but to select a lower-priority cell (frequency) at the time of high-speed movement, which will be described next.

4.2) Cell Reselection Control by Mobile Terminal

When receiving broadcast information as described above from the base station 20, the control section 102 of the mobile terminal 10 stores in the memory 105 a neighbor cell list and frequency (cell type)-priority assignment information included in the broadcast information and performs cell reselection control, which will be described next. Hereinafter, cell reselection control will be described with reference to FIGS. 2 and 13.

Figure 13:
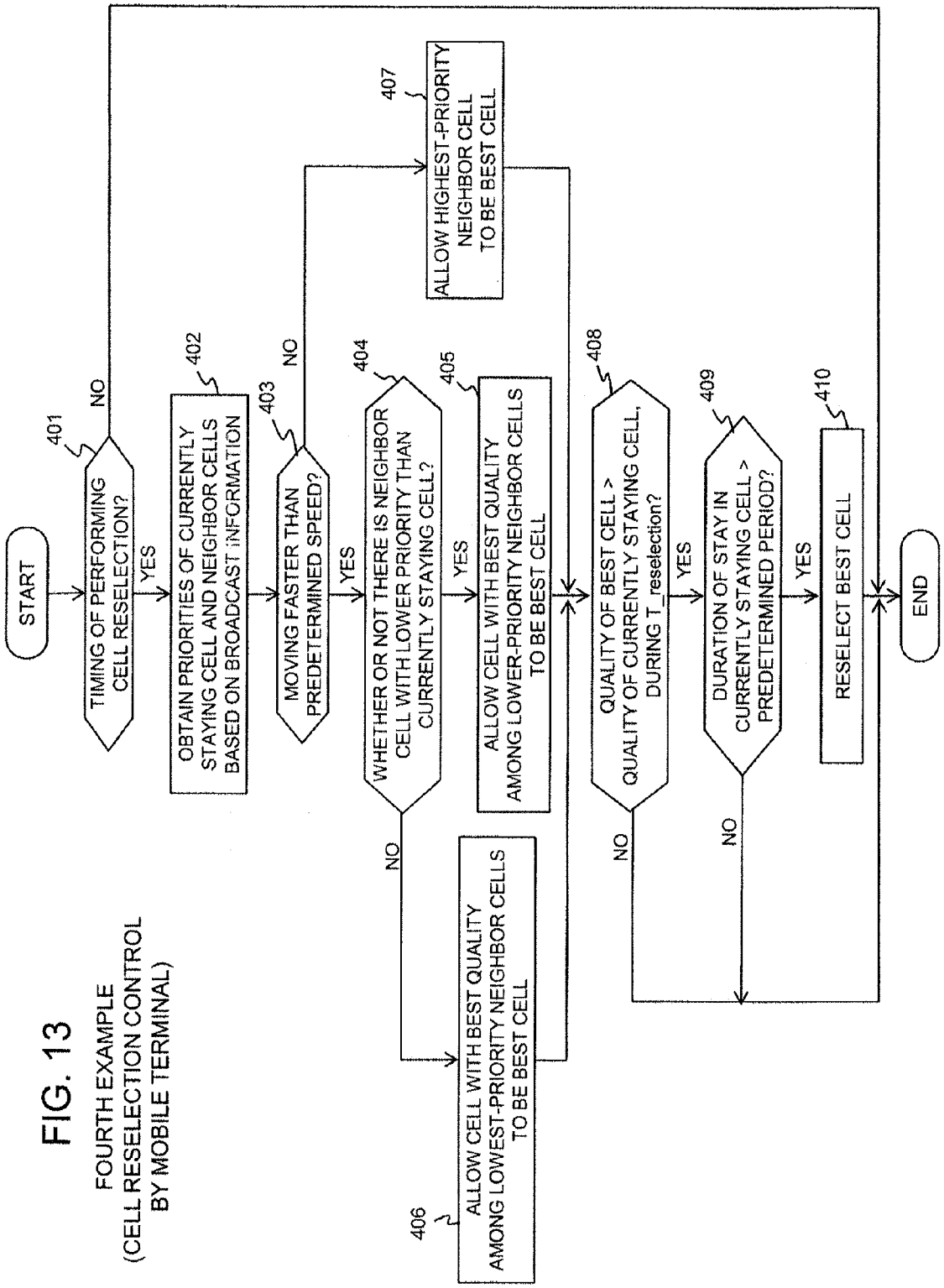
FIG. 13 is a flowchart showing cell reselection control operation of a mobile terminal according to the fourth example.

Referring to FIG. 13, the mobility determination control section 103 of the mobile terminal 10, upon detecting a timing of performing cell reselection (Operation 401; YES), refers to the memory 105 and obtains the priorities of a currently staying cell and neighbor cells (Operation 402). Subsequently, the mobility determination control section 103 determines whether or not the mobile terminal 10 is moving at a speed higher than a predetermined speed (Operation 403). When the mobile terminal 10 is moving faster than the predetermined speed (Operation 403; YES), the mobility determination control section 103 determines whether or not there is a cell (frequency) with a priority lower than that of the currently staying cell (Operation 404) and, if there are such lower-priority neighbor cells (Operation 404; YES), decides on, as a best cell, a cell that has the best quality among the lower-priority neighbor cells (Operation 405). Note that for a method for and a timing of detecting high-speed movement, detection can be achieved by using the frequency of cell reselections performed within a predetermined period of time or the like as an index, as described in NPL 1, 5.2.6.1 and NPL 2, 5.2.4.3. If there is no lower-priority neighbor cell (Operation 404; NO), the mobility determination control section 103 decides on, as a best cell, a cell that has the best quality among those of the neighbor cells that have the lowest priority (Operation 406).

When the mobile terminal 10 is at a stop or is moving at a speed not higher than the predetermined speed (Operation 403; NO), the mobility determination control section 103 decides on, as a best cell, a neighbor cell that has the highest priority (Operation 407).

Upon determining the best cell, the mobility determination control section 103 calculates a cell reselection timer (T_reselection) for the best cell by using a cell reselection timer (t-ReselectionEUTRA) corresponding to this best cell and one speed-dependent scaling factor (t-ReselectionEUTRA-SF) corresponding to the mobility speed of the mobile terminal, and sets it on the mobility determination timer 104. Subsequently, the mobility determination control section 103 determines whether or not the quality of the best cell exceeds the quality of the currently staying cell during the calculated T_reselection (Condition 1), and whether or not staying on the currently staying cell lasts over a predetermined period of time (one second, according to 3GPP TS36.304, 5.2.4.6) (Condition 2) (Operations 408 and 409). If both Conditions 1 and 2 are satisfied (Operation 408; YES, Operation 409; YES), the mobility determination control section 103 performs cell reselection to this best cell (Operation 410) and completes processing. Any one of Conditions 1 and 2 is not satisfied (Operation 408; NO, or Operation 409; NO), the cell reselection control by the mobile terminal is terminated.

Note that the cell reselection timer (t-ReselectionEUTRA) can be configured to be settable for each neighbor cell/cell type, as described in the above-described first to third examples.

4.3) Concrete Example

Next, concrete operation of the mobile terminal 10 staying on a micro cell (with priority 3) will be described, taking a case as an example where broadcast information as shown in FIG. 12 is broadcast. It is assumed that a macro cell, a pico cell, and a femto cell exist, neighboring on this micro cell. A different frequency is used in the macro cell, which is assigned priority 1 lower than the priority of the micro cell. The pico cell is assigned priority 5, which is higher than the priority of the micro cell, while the femto cell is assigned higher priority 7.

The mobile terminal 10 staying on the micro cell performs cell reselection preferentially to the higher-priority pico cell or femto cell when it is not in high-speed state (Operation 403; NO in FIG. 13). However, in high-speed movement state (Operation 403; YES in FIG. 13), the mobile terminal 10 preferentially selects the lower-priority macro cell. Thus, at the time of high-speed movement, the higher-priority pico cell or femto cell is not selected, whereby the frequency of reselections to small cells can be reduced, and on the whole, location registration signaling can be reduced.

Note that although an example of frequency reselection within LTE (intra LTE) is mainly described in FIGS. 12 and 13, similar effects can be obtained in cases of UTRA, GERAN, and CDMA2000 cell reselection, by selecting a lower-priority frequency in high-speed state. Moreover, although a case of LTE is descried in the present example, the present example can be applied similarly to UTRA and other radio access systems. Furthermore, a similar method can be applied by notifying priorities to each mobile terminal individually by using a RRC message or the like other than broadcast information.

4.4) Effects

According to the fourth example of the present invention, in the absolute priority-based frequency reselection mechanism, a mobile terminal moving at high speed performs control such as to select a lower-priority frequency (cell), whereby the possibility of reselection to a small cell at the time of high-speed movement is lowered, and a reduction of location registrations in small cells can be achieved.

5. Fifth Example

In the above-described fourth example, priorities assigned to individual frequencies are used, as in the current absolute priority mechanism. According to a fifth example of the present invention, however, in LTE, priorities are assigned to individual cells, as in HCS (Hierarchical Cell Structure) introduced in 3G, and a mobile terminal in high-speed state preferentially selects a cell with a priority lower than that of a currently staying cell. In this case, a macro cell, a micro cell, and a small cell do not need to use different frequencies but may use the same frequency. As described above, HCS is introduced into LTE, and control is performed such that a mobile terminal moving at high speed can select a lower-priority cell, whereby the possibility of reselection to a small cell at the time of high-speed movement can be reduced.

In LTE, different priorities are assigned to different cells, as shown in FIG. 14. A method for assigning priorities depends on a policy of an operator. For example, if an attempt is made to have mobile terminals gather in small cells, a higher priority is assigned to a cell of a smaller size. The lowest priority 1 is assigned to macro cells, and as for cells ranging from micro cell to femto cell, larger priorities are assigned to them as they have smaller sizes, as shown in FIG. 14. Accordingly, when a low-speed mobile terminal staying on a micro cell stays in the vicinity of a pico cell, the mobile terminal performs cell reselection to the pico cell.

However, when the mobile terminal 10 is moving at high speed, it only passes through a cell of a small cell size in many cases as described already, in which case it is preferable that cell reselection be avoided. Accordingly, the mobility determination control section 103 of the mobile terminal according to the fifth example of the present invention, at the time of high-speed movement (Operation 403; YES in FIG. 13), performs control such as not to select a high-priority cell but to select a lower-priority cell (Operation 405 in FIG. 13), as described using the flow in FIG. 13. If there is no neighbor cell that has a lower priority than the currently staying cell, control is performed such as to select a cell that has the best quality and has the lowest priority among neighbor cells (Operation 406 in FIG. 13).

According to the example shown in FIG. 14, the mobile terminal 10 is staying on a micro cell (with priority 3), and a macro cell, a pico cell, and a femto cell exist as neighbor cells of the micro cell. The same frequency is assigned to the macro cell, which is assigned priority 1 lower than that of the micro cell. The pico cell is assigned priority 5, which is higher than that of the micro cell, while the femto cell is assigned higher priority 7.

When the mobile terminal 10 staying on the micro cell is not in high-speed state (Operation 403; NO in FIG. 13), it performs cell reselection preferentially to the higher-priority pico cell or femto cell. However, in high-speed movement state (Operation 403; YES in FIG. 13), the mobile terminal preferentially selects the lower-priority macro cell, whereby it is possible to reduce the frequency of cell reselections. Thus, at the time of high-speed movement, the higher-priority pico cell or femto cell is not selected, whereby the frequency of reselections to small cells can be reduced, and on the whole, location registration signaling can be reduced.

As described above, according to the fifth example of the present invention, priorities are introduced on individual neighbor cells in LTE as in HCS, whereby a mobile terminal moving at high speed can perform control such as to select a lower-priority cell, whereby the possibility of reselection to a small cell at the time of high-speed movement is lowered, and a reduction of location registrations in small cells can be achieved.

Note that the absolute priority, which is priority on each frequency defined by 3GPP, may be applied concurrently with priority on each cell.

6. Sixth Example

In the above-described first to third examples, a cell reselection timer and a speed-dependent scaling factor are introduced for each neighbor cell/cell type when the RRC state of a mobile terminal is idle state. However, the present invention is not limited to cell reselection control in idle state. According to a sixth example of the present invention, a measurement time timer for handover event evaluation (Time To Trigger), as a mobility determination time, is introduced for each neighbor cell/cell type when the RRC state of a mobile terminal is active state, whereby it is possible to set multiple Time To Triggers.

6.1) Broadcast Information

According to the current NPL 4 (3GPP TS36.331), Time To Trigger for measurement of LTE neighbor cells is defined in ReportConfigEUTRA, and Time To Triggers are given for individual events. In the sixth example of the present invention, measurement time timers (Time To Trigger) are defined for individual neighbor cells, and a base station notifies them to a mobile terminal by using a RRC protocol message (e.g., rrcConnectionReconfiguration message or the like).

FIG. 15 shows extended CellsToAddMod ID (a neighbor cell list) notified for each neighbor cell by using rrcConnectionReconfiguration in the sixth example of the present invention. Referring to FIG. 15, for each PhysCellId, which is a physical identifier of a neighbor cell, a measurement time timer, timeToTrigger, and a speed-dependent scaling factor, timeToTrigger-SF, are notified to a mobile terminal. Here, the speed-dependent scaling factors timeToTrigger-SF are an extended version of speed-state scaling factors (SpeedStateS-caleFactors-vabc), and their values not only range from 0 to 1, but the range thereof is extended beyond 1. For example, the values of the speed-dependent scaling factor timeToTrigger-SF can be defined as values in increments of 0.25 within a range from a minimum of 0.25 to a maximum of 100. Thus, for the mobile terminal 10 moving at high speed, the cell reselection timer T_reselection can be extended 100 times at maximum. That is, similarly to the cell reselection described in the first to third examples, a measurement time timer Time To Trigger and a speed-dependent scaling factor timeToTrigger-SF are applied for each neighbor cell/cell type, whereby measurement times for handover can be obtained for individual neighbor cells/cell types.

6.2) Handover Control by Mobile Terminal

Figure 16:
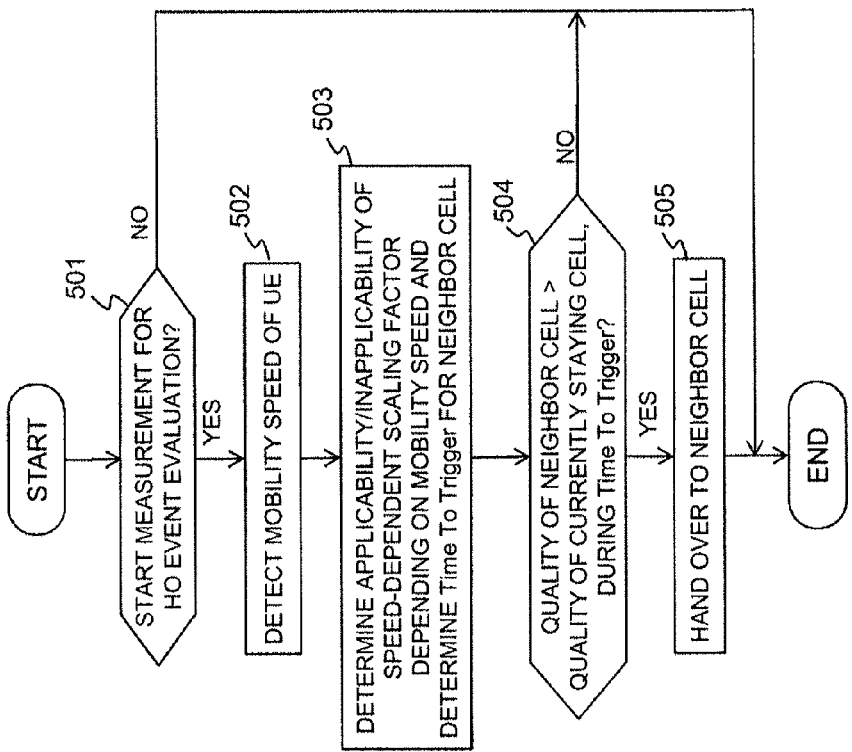
FIG. 16 is a flowchart showing handover control operation of a mobile terminal according to the sixth example.

Referring to FIG. 16, the control section 102 of the mobile terminal 10, upon receiving a RRC protocol message from a base station, stores a neighbor cell list in the memory 105, and the mobility determination control section 103 starts neighbor cell measurement for evaluating a handover event, in accordance with a measurement instruction (Operation 501; YES). Here, it is assumed that a macro cell base station and a small cell base station notify a timeToTrigger and a timeToTrigger-SF for each neighbor cell by using a RRC protocol message. Here, a description will be given by taking, as an example, Event A3 (the quality of a neighbor cell becomes better than the quality of a currently staying cell by the amount of an offset) described in NPL 4, 5.5.4.4.

The mobility determination control section 103 determines whether or not the mobile terminal 10 is moving at a speed higher than a predetermined speed. The mobility determination control section 103 applies a speed-dependent scaling factor timeToTrigger-SF when the mobile terminal 10 is moving at a speed higher than the predetermined speed, but does not apply it when the speed is lower, thus determining a measurement time timer timeToTrigger for a neighbor cell (Operation 503). For a method for and a timing of detecting high-speed movement, detection can be achieved by using the frequency of cell reselections performed within a predetermined period of time or the like as an index, as described in NPL 1, 5.2.6.1 and NPL 2, 5.2.4.3. Subsequently, the mobility determination control section 103 determines whether or not the quality of a neighbor cell exceeds the quality of the currently staying cell during the determined measurement time timer timeToTrigger (Operation 504) and, if the neighbor cell is better than the currently staying cell (Operation 504; YES), performs handover to the neighbor cell (Operation 505). Note that the present case has been described by using Event A3 as an example but can be extended similarly to other Events described in NPL 4.

Note that the procedure shown in FIG. 16 can be extended similarly to different-frequency measurement and measurement for handover with GERAN (GSM/EDGE Radio Access Network), CDMA2000, and UMTS.

6.3) Concrete Example

Next, concrete operation of the mobile terminal 10 staying on a macro cell 21a will be described, taking a case as an example where a neighbor cell list as shown in FIG. 17 is broadcast.

Referring to FIG. 17, it is assumed that macro cells 22a and 23a, micro cells 24b and 25b, pico cells 26c and 27c, and femto cells 28d and 29d neighbor on the macro cell 21a on which the mobile terminal 10 is staying. "PhysCellId" is an abbreviation of Physical Cell ID and is identification information (ID) for identifying a cell at the physical channel level. Measurement time timers timeToTrigger and speed-dependent scaling factors timeToTrigger-SF are set for individual neighbor cells/neighbor cell types and notified across the coverage of the macro cell 21*a*. Here, the measurement time timer timeToTrigger and speed-dependent scaling factor timeToTrigger-SF are set to small values, respectively, if a neighbor cell is a macro cell, and they are set to larger values as a neighbor cell has a smaller size.

For example, since a speed-dependent scaling factor is not applied when the mobile terminal is not at high speed, handover to, for example, the macro cell 22*a* is performed if the quality of the macro cell 22*a* is good during the measurement time timer timeToTrigger (=2 seconds). On the other hand, handover to the pico cell 26*c* is not performed unless the quality of the pico cell remains good for the measurement time timer timeToTrigger (=6 seconds). Thus, for a mobile terminal that stays in the vicinity of a pico cell only for a few seconds, handover to the pico cell is avoided.

When the mobile terminal 10 is at high speed, a speed-dependent scaling factor timeToTrigger-SF is applied. However, when handover to the macro cell 22*a* is performed, speed is not considered because the speed-dependent scaling factor timeToTrigger-SF=1.0. On the other hand, for handover to the pico cell 26*c*, the pico cell needs to remain in good state in quality for 30 seconds (=6 seconds×5.0). That is, handover of a mobile terminal that stays in the vicinity of a pico cell only for about 20 seconds is avoided. As described above, a timeToTrigger and a timeToTrigger-SF are introduced for each neighbor cell/neighbor cell type, whereby it is possible to obtain the effect of a reduction of handovers to small cells such as femto cells and pico cells.

Although an example of same-frequency handover within LTE (intra LTE) is mainly described in FIG. 16, similar effects can be obtained in cases of handover to a different frequency and handover to UTRA, GERA, and CDMA 2000. Moreover, although a case of LTE is descried in the present example, the same applies in cases of UTRA and other radio access systems. Furthermore, measurement time timers Time To Trigger and speed-dependent scaling factors for individual neighbor cells/neighbor cell types may be notified by using a protocol message other than a RRC protocol handover measurement message.

6.4) Effects

According to the sixth example of the present invention, a measurement time timer for handover event evaluation (Time To Trigger) and/or speed-dependent scaling factor timeToTrigger-SF is introduced for each neighbor cell/cell type when the RRC state of a mobile terminal is active state, whereby the effect of a reduction of handover signaling to small cells can be obtained. Handover control following high-speed movement, targeting only a specific neighbor cell, can be achieved particularly by changing the speed-dependent scaling factor timeToTrigger-SF.

7. Other Examples

For the cell reselection timer and speed-dependent scaling factor for each neighbor cell/cell type introduced in the first to third examples, the priority on each frequency introduced in the fourth example, the priority on each cell introduced in the fifth example, and the Time To Trigger and speed-dependent scaling factor introduced in the sixth example described above, optimization may be performed by Self Organization Network (SON) so that the number of location registration signaling in a heterogeneous network falls within a given allowable range. In this case, a new parameter introduced considering the handover success rate, system throughput or the like other than location registration signaling may be optimized.

INDUSTRIAL APPLICABILITY

The present invention is applicable to cell reselection control and handover control in heterogeneous networks.

REFERENCE SIGNS LIST

10 Mobile terminal
20 Base station
20*a* Macro cell base station
20*b* Small cell base station
30 Mobility management station
101 Radio transceiver section
102 Control section
103 Mobility determination control section
104 Mobility determination timer
105 Memory
201 Radio transceiver section
202 Control section
203 Database
204 Transceiver section

The invention claimed is:

1. A base station comprising:
   a transmitter for transmitting first information and second information to a terminal; and
   a controller that controls the transmitter,
   wherein the first information indicates a first Time To Trigger which is applied to one or more cells of a plurality of cells to be measured by the terminal,
   wherein the second information indicates a second Time To Trigger which is applied to the remaining cells of the plurality of cells, and
   wherein each of the plurality of cells can be identified by a Physical Cell ID.

2. The base station according to claim 1, wherein the first information and the second information are included in a RRC (Radio Resource Control) protocol message.

3. The base station according to claim 1, wherein the first information and the second information are included in a RRC Connection Reconfiguration message.

4. A terminal comprising:
   a receiver for receiving first information and second information from a base station; and
   a controller that is configured to measure a radio quality,
   wherein the first information indicates a first Time To Trigger which is applied to one or more cells of a plurality of cells to be measured by the terminal,
   wherein the second information indicates a second Time To Trigger which is applied to the remaining cells of the plurality of cells, and
   wherein each of the plurality of cells can be identified by a Physical Cell ID.

5. The terminal according to claim 4, wherein the first information and the second information are included in a RRC (Radio Resource Control) protocol message.

6. The terminal according to claim 4, wherein the first information and the second information are included in a RRC Connection Reconfiguration message.

7. The base station according to claim 1, wherein a part of a frequency band used by a cell to which the first information is applied is the same as a part of a frequency band used by a cell to which the second information is applied.

8. The base station according to claim 1, wherein when a radius of a cell to which the first information is applied is larger than that of a cell to which the second information is applied, and
   wherein the first Time To Trigger is shorter than the second Time To Trigger.

9. The base station according to claim 1, wherein a cell to which the first information is applied a different cell type from that of a cell to which the second information is applied.

10. The base station according to claim 1, wherein a cell to which the first information is applied is a macro cell and a cell to which the second information is not a macro cell.

11. The base station according to claim 1, wherein the transmitter transmits a first parameter and a second parameter to the terminal,
   wherein the first parameter corresponds to a cell to which the first information is applied,
   wherein the second parameter corresponds to a cell to which the second information is applied, and
   wherein the first parameter and the second parameter depend on a speed of the terminal.

12. The terminal according to claim 4, wherein the controller measures the radio quality based on the first information and second information.

13. The terminal according to claim 4, wherein the controller measures the radio quality of a cell to which the first information is applied based on the first information, and wherein the controller measures the radio quality of a cell to which the second information is applied based on the second information.

14. The terminal according to claim 4, wherein a part of a frequency band used by a cell to which the first information is applied is the same as a part of a frequency band used by a cell to which the second information is applied.

15. The terminal according to claim 4, wherein when a radius of a cell to which the first information is applied is larger than that of a cell to which the second information is applied, and
   wherein the first Time To Trigger is shorter than the second Time To Trigger.

16. The terminal according to claim 4, wherein a cell to which the first information is applied a different cell type from that of a cell to which the second information is applied.

17. The terminal according to claim 4, wherein a cell to which the first information is applied is a macro cell and a cell to which the second information is not a macro cell.

18. The terminal according to claim 4, wherein the receiver receives a first parameter and a second parameter from the base station,
   wherein the first parameter corresponds to a cell to which the first information is applied,
   wherein the second parameter corresponds to a cell to which the second information is applied, and
   wherein the first parameter and the second parameter depend on a speed of the terminal.

* * * * *